June 11, 1968 — W. MERZ — 3,388,145
PRODUCTION OF LOWER ALKYL ISOCYANATES
Filed July 1, 1964
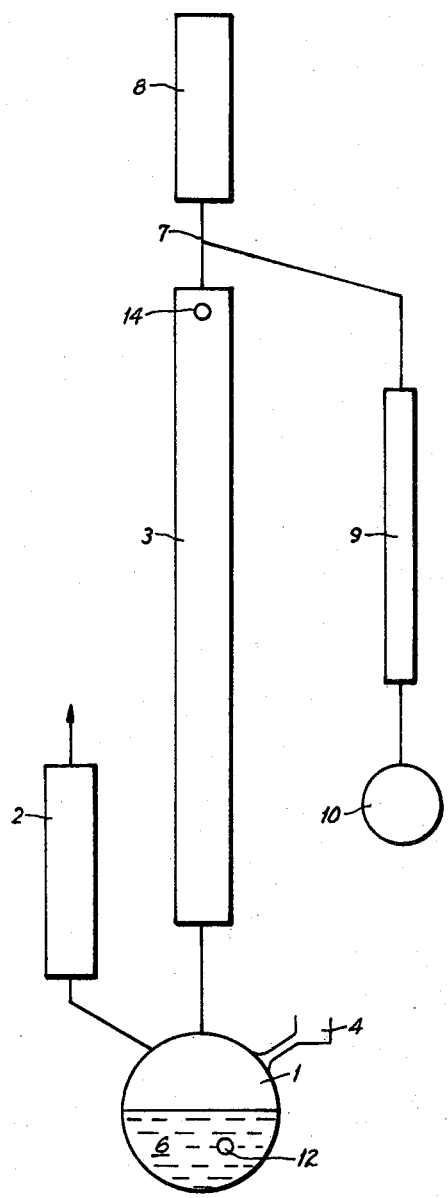
INVENTORS:
WALTER MERZ
BY [signature]
ATTORNEY United States Patent Office 3,388,145
Patented June 11, 1968

3,388,145
PRODUCTION OF LOWER ALKYL
ISOCYANATES
Walter Merz, Leverkusen, Germany, assignor to Farbenfabriken Bayer Aktiengesellschaft, Leverkusen, Germany, a German corporation
Filed July 1, 1964, Ser. No. 379,540
Claims priority, application Germany, July 12, 1963, F 40,221
3 Claims. (Cl. 260—453)

ABSTRACT OF THE DISCLOSURE

Preparation of methyl, ethyl, n-propyl, isopropyl and allyl isocyanates by decomposition of the corresponding carbamyl chloride and separation of the HCl and isocyanate. The HCl and isocyanate are separated by cooling a portion of the mixture to a temperature below the boiling point of the isocyanate being prepared, removing the HCl from this portion, maintaining the resulting mixture at substantially the boiling point of the isocyanate until the balance of the HCl has recombined to form the corresponding carbamyl chloride and collecting the excess free isocyanate from the mixture.

---

This invention relates to the production of organic isocyanates, and more particularly, to the preparation of lower alkyl isocyanates.

It has been known previously to prepare isocyanates by boiling the corresponding carbamyl chloride under reflux, to thermally split the carbamyl chloride into hydrogen chloride and isocyanate. This process has been commonly carried out either in the presence or absence of a solvent. For example, in the preparation of phenyl isocyanate, a quantity of N-phenyl carbamyl chloride, either alone or dissolved in benzene or toluene, is boiled under reflux to split off hydrogen chloride so that a product is obtained which may be easily purified by distillation (J. Am. Chem. Soc., 72, 1888 (1950)). Although this process has been found expedient for the production of isocyanates whose boiling points are higher than the decomposition temperatures of the corresponding carbamyl chlorides, those isocyanates whose boiling points are below the decomposition point of the corresponding carbamyl chlorides cannot be produced in this manner (Annalen, 562, 75; Houben-Weyl, vol. 8/3 page 119, Chemical Reviews, 43, 203 (1948); Ullman, vol. 9, page 1).

Therefore, methyl, ethyl, n-propyl, i-propyl and allyl isocyanates cannot be produced from their corresponding carbamyl chlorides since the boiling point of these isocyanates is below the decomposition temperature of the corresponding carbamyl chloride. Consequently, although these carbamyl chlorides are indeed split into hydrogen chloride and the corresponding isocyanate when boiled, very little of the hydrogen chloride which forms leaves the reaction chamber and an equilibrium is set up between the isocyanate, hydrogen chloride, and carbamyl chloride in a gaseous phase. Attempts to extract the isocyanate by condensation from the gaseous phase cause the reformation of the carbamyl chloride in an exothermic reaction.

In an effort to circumvent this difficulty, isocyanates prepared from alkyl radicals containing one to three carbon atoms have been prepared by reacting the corresponding carbamyl chlorides with bases such as calcium oxide or tertiary amines which bind the hydrogen chloride split off in the thermal decomposition. However, in this reaction some of the isocyanate formed is trimerized resulting in small yields of the isocyanate making the whole process impractical.

Isocyanates have also been prepared by thermal cracking of suitable urethanes or ureas; however, these processes have also been found to be similarly unsuitable for the preparation of isocyanates of lower alkyl groups.

It is therefore an object of this invention to provide a process for the preparation of isocyanates of lower alkyl groups which is devoid of the foregoing disadvantages.

A further object of this invention is to provide an apparatus in which alkyl isocyanates having a boiling point below the decomposition temperature of their corresponding carbamyl chlorides may be prepared.

A further object of this invention is to provide a means for the preparation of isocyanates which is safe, efficient and economical.

These and other objects which will become apparent from the following description with reference to the accompanying schematic diagram are accomplished in accordance with this invention, generally speaking, by providing a process for the preparation of alkyl isocyanates by the thermal decomposition of the corresponding N-alkyl carbamyl chloride in a suitable inert organic solvent having a boiling point at least 10° C. above the boiling point of the alkyl isocyanate to be prepared which comprises simultaneously distilling the alkyl isocyanate and removing the hydrogen chloride formed during the thermal decomposition. In this process, a reflux condenser is expediently employed to remove the hydrogen chloride and the alkyl isocyanate formed is distilled through a column.

The invention is more conveniently described with reference to the accompanying schematic diagram in which a distillation flask 1 is connected to a reflux condenser 2, a column 3, and an inlet tube 4, through which the solution of the carbamyl chloride in a suitable solvent 6 is introduced. The column 3, which may be any one of the filled-body-type columns such as metallized columns filled with glass Raschig rings, or columns provided with bubble plates, is connected to a reflux divider 7, which is in turn connected to a reflux condenser 8, and a product condenser 9 which is connected to a receiver 10. A means for measuring the temperature is located at point 12 in the distillation flask 1 and at point 14 in the column 3.

In the practice of this invention, the solvent does not react chemically but is used only to dilute the N-alkyl carbamyl chloride and to prevent polymerization; therefore, any suitable inert organic solvent having a boiling point at least 10° C. above that of the isocyanate which is to be produced may be used. For example, any suitable aliphatic hydrocarbon such as pentane, hexane, heptane, octane, cyclohexane and methyl cyclohexane may be used; any suitable halogenated aliphatic hydrocarbon such as methylene chloride, chloroform, carbon tetrachloride, n-propyl chloride, n-butyl chloride and isomers, amyl chloride, cyclohexyl chloride, ethylidene chloride, dichlorethylene, ethylene chloride, dichloropropane, dichlorobutane, isopropyl bromide, n-propyl bromide, butyl bromide, ethyl iodide, propyl iodide and fluorinated or partially fluorinated compounds and such aromatic and substituted aromatic hydrocarbons as benzene, toluene, xylene, ethyl benzene, chlorobenzene, dichlorobenzene, fluorobenzene, difluorobenzene, nitrobenzene may also be used in addition to aromatic ethers and such naphthalene derivatives as chloronaphthalene, dichloronaphthalene and methyl naphthalene. Other solvents operable in the practice of this invention include such ketones as acetone, methylethylketone, diethylketone and acetophenone; esters as ethyl formate, alkyl acetates and esters of propionic acid and phthalic acid and any other such esters having a high boiling point. Other organic compounds which do not necessarily fall within any of the aforementioned groups, but which are operable in the practice of this invention are carbon disulphide, methyl tert.-butyl ether, ethyl propyl ether, tetrahydrofuran and acetonitrile.

Since the function of the solvent is to dilute the carbamyl chloride and prevent polymerization, the concentration of the N-alkyl carbamyl chloride in the solvent is variable within wide limits. For best results, however, the concentration should lie within the range of from about 1 to about 30% by weight.

The essence of this invention is that the lower alkyl isocyanates may be produced from their corresponding carbamyl chlorides by thermal decomposition where heretofore such a means for their preparation was impossible, making necessary the longer more involved methods of the prior art. With the apparatus and method of this invention, such involved methods are obviated by a simple, efficient, and economical process which is foolproof.

With reference to the schematic diagram, a solution 6 of a carbamyl chloride of a lower alkyl isocyanate at a concentration of between about 1 to about 30% by weight in any one of the aforementioned suitable solvents having a boiling point of at least 10° C. above that of the isocyanate to be produced is introduced into the distillation flask 1 through the inlet 4. The solution is heated while the temperature is measured in the flask 12 and at the head of the column 14, and the reflux condenser 2 is cooled to a temperature substantially below that of the boiling point of the NCO being prepared. Heating with subsequent splitting off of the hydrogen chloride is continued without removal of the product until the temperature at the head of the column becomes constant; the hydrogen chloride being removed at the reflux condenser 2 while the isocyanate being prepared is refluxed. A very interesting aspect of the invention is noted here: The hydrogen chloride evolves through the reflux condenser 2, but does not pass through the column 3. The reason for this phenomenon is that the hydrogen chloride cannot pass through the column since it recombines with the excess of alkyl isocyanate present in the column to reform the corresponding N-alkyl carbamyl chloride. Due to the fractionating effect of the column, the carbamyl chloride is returned to the distillation flask 1 and again thermally split resulting ultimately in a complete absence of carbamyl chloride in the distillate.

When the temperature at the head of the column 3 as measured at point 14 has become constant, the alkyl isocyanate which has been refluxing by means of the reflux condenser 8 is allowed to be channeled instead by means of a reflux divider 7, to the product condenser 9 and then into the receiver 10 from which it may be conveniently removed. In this manner, the alkyl isocyanate may be continuously removed from the reaction chamber so that no equilibrium will set up to stop the evolution of hydrogen chloride.

Where it is feasible, one may also use several condensers arranged in parallel instead of the single reflux condenser 2 in order to increase the cooling surface available and accelerate the splitting off of the hydrogen chloride.

Further, the reflux condenser 8 can be placed under a superatmospheric pressure of from about 1 to about 50 mm. of mercury by using an inert gas such as nitrogen or carbon dioxide. By this device the return flow in the condenser is reduced and the reflux into the column is simultaneously improved.

In addition, should it be so desired, the method and apparatus of this invention may be readily utilized in a continuous type of process simply by continuously introducing the pure N-alkyl carbamyl chloride into the distillation flask 1 through the inlet 4 at a rate corresponding to that at which the product is being removed.

It is noteworthy that the absence of either the reflux condenser 2 or the column 3 causes a tremendously significant difference in the results obtained, indicating thereby the importance of the presence of both devices in an apparatus paralleling the one depicted in the schematic diagram. For example, it has been noted that in the absence of the reflux condenser 2 only about 20% of the hydrogen chloride splits off due to the recombination of the hydrogen chloride with the isocyanate. This presents the state of the art before the present invention since just such an occurrence made it impossible to prepare the isocyanates of the lower alkyl groups by the thermal decomposition of the corresponding carbamyl chloride.

Further, in the absence of the column where the solution is boiled under reflux without the benefit of the column, the reaction reaches an equilibrium and stops after only about 40% of the hydrogen chloride is split off. These figures are significant in demonstrating the import of each of the major constituents of the apparatus.

In the preferred embodiment of this invention, about a 20% solution of N-methyl carbamyl chloride in carbon tetrachloride is heated by any suitable means such as a heating mantle, Bunsen burner and the like in the apparatus hereinbefore described. Hydrogen chloride splits off and escapes through the reflux condenser 2 which is maintained at a temperature of about 20° C. The hydrogen chloride escapes through the condenser 2 and the methyl isocyanate is refluxed at the top of column 3 by reflux condenser 8 until the temperature at the head of column 3 becomes constant at about 38.5° C., the boiling point of the methyl isocyanate being prepared. The methyl isocyanate is then removed from the system through a reflux divider and a product condenser which channels the product into a receiver.

Although pure N-alkyl carbamyl chlorides of the corresponding methyl, ethyl, n-propyl, i-propyl, and allyl isocyanates have been discussed it should be understood that pure N-alkyl carbamyl chlorides need not necessarily be used in this process. Mixtures of N-alkyl carbamyl chloride and the corresponding isocyanate may also be used and the process can also be employed for the purification of an isocyanate alone. Further, this process is expedient in the production of isocyanates which heretofore were already easily obtainable by thermal decomposition, such as butyl-, ampyl-, hexyl-, stearyl-, cyclohexyl-, phenyl-, tolyl-, chlorophenyl and dichlorophenyl isocyanate as well as diisocyanates such as toluene diisocyanate and hexamethylene diisocyanate.

In using the process according to the invention, therefore, it is possible for isocyanates which have a boiling point below the decomposition temperature of the corresponding N-alkyl carbamyl chloride to be produced either continuously or in a batchwise process. High yields and a high purity may be easily obtained by the distillation process involved herein with no formation of secondary products. Methyl, ethyl, n-propyl, i-propyl and allyl isocyanates are most conveniently produced by the process of this invention, but any isocyanate which may be prepared by the thermal decomposition of the corresponding carbamyl chloride may also be prepared by the method and apparatus of this invention. The isocyanates thus produced may be utilized for any application in which isocyanates are found to be useful. Most especially, they may be used in the preparation of cellular and elastomeric polyurethanes. In such applications, the isocyanate is reacted with a compound containing at least two reactive hydrogen containing groups as determinable by the Zerewitinoff method to produce a cellular polyurethane, with the concurrent use of a catalyst blowing agent and stabilizer if desired, or an elastomeric polyurethane.

The invention is further described in the following example which is solely for the purpose of illustration and is not intended to limit the invention in any way.

Example

About 2.38 mols of N-methyl carbamyl chloride, dissolved in 1.3 liters of carbon tetrachloride, are introduced into an apparatus such as the one depicted in the schematic diagram and heated to the boiling point. The reflux condensers are cooled with water at a temperature of about 20° C. The boiling point of the solution is about 71° C.

The hydrogen chloride which splits off initially, evolves through the reflux condenser and is collected in a sodium hydroxide solution in order to be analyzed. The temperature at the head of the column becomes constant after the evolution of about 1.65 mols of hydrogen chloride at 38.5° C., the boiling point of the methyl isocyanate. The product is then allowed to condense and is removed. Over four hours, 2.13 mols of pure, chlorine-free methyl isocyanate are removed corresponding to a yield of about 90% of the theoretical yield. The total quantity of hydrogen chloride split off is 2.3 mols (corresponding to about 97% of the theoretical yield).

On completion of the experiment, only small quantities of N-methyl carbamyl chloride could still be found in the sump of the column.

The same N-methyl carbamyl chloride solution boiled under reflux without the use of a column 3 results in the cessation of the thermal decomposition, after only 43% of the hydrogen chloride is split off. Where the same experiment is run using the column without the reflux condenser, only about 20% of the hydrogen chloride is split off due to the recombination of the hydrogen chloride with the isocyanate.

Although methyl carbamyl chloride dissolved in carbon tetrachloride has been used in the foregoing for the purposes of illustration, it is to be understood that any N-alkyl carbamyl chloride in any suitable solvent may be used in accordance with the disclosure hereinbefore set forth.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of methyl, ethyl, n-propyl, isopropyl or allyl isocyanate which comprises dissolving the corresponding carbamyl chloride in an inert organic solvent having a boiling point at least 10° C. above the boiling point of the isocyanate being prepared, heating the resulting solution to decompose said carbamyl chloride and generate a gaseous mixture of HCl and said isocyanate, cooling and refluxing the mixture to a temperature below the boiling point of the isocyanate being prepared, removing HCl therefrom, maintaining the resulting mixture at substantially the boiling point of the isocyanate being prepared until the balance of the HCl has recombined to form the corresponding carbamyl chloride and collecting the resulting substantially HCl free isocyanate.

2. The process of claim 1 wherein said isocyanate is methyl isocyanate.

3. The process of claim 1 wherein said inert organic solvent is carbon tetrachloride.

References Cited

UNITED STATES PATENTS 2,480,088   8/1949   Slocombe et al. _____ 260—544

CHARLES B. PARKER, *Primary Examiner.*

D. H. TORRENCE, *Assistant Examiner.*